(No Model.)
J. W. EASTON.
DYNAMO ELECTRIC MACHINE.
No. 366,941. Patented July 19, 1887.
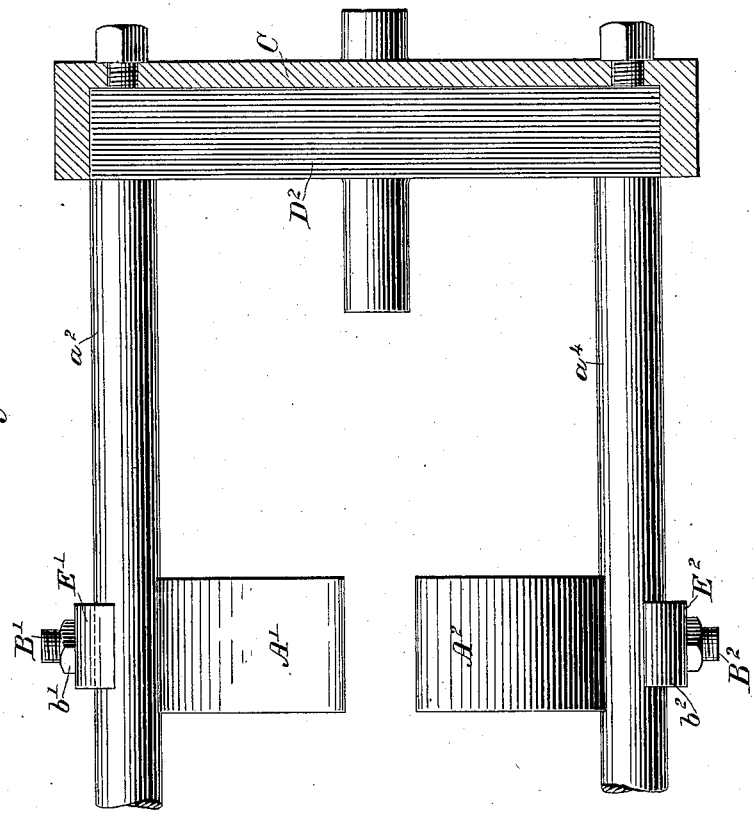
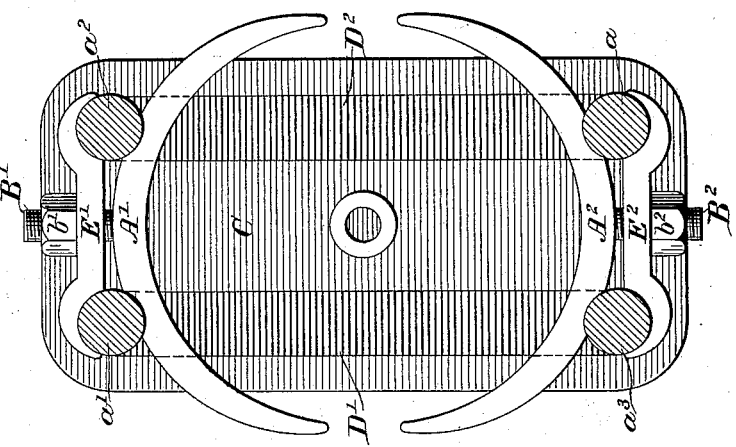
Witnesses
Geo. W. Breck
Carrie E. Ashley
By his Attorneys
Pope & Edgecomb
Inventor
James W. Easton

United States Patent Office.

JAMES W. EASTON, OF NEW YORK, N. Y.

DYNAMO-ELECTRIC MACHINE.

SPECIFICATION forming part of Letters-Patent No. 366,941, dated July 19, 1887.

Application filed September 4, 1886. Serial No. 212,689. (No model.)

*To all whom it may concern:*

Be it known that I, JAMES W. EASTON, a subject of the Queen of Great Britain, residing in New York, in the county and State of New York, have invented certain new and useful Improvements in Dynamo-Electric Machines, of which the following is a specification.

The invention consists in forming the end plates of the machine partly of cast and partly of wrought iron, and it also involves a novel method of supporting the polar projections from the cores of the field-magnets.

Usually the end frames have been made entirely of cast-iron. The cast-iron, however, does not become as highly magnetized as the wrought-iron cores are capable of being magnetized, and thus the machine is less efficient than it otherwise would be. It was then proposed to make them entirely of wrought-iron; but this construction renders the machine less permanent, for when it is allowed to stand idle for any considerable length of time it is liable to lose its polarization. I construct the end plates of cast-iron, but embed in these plates wrought-iron bars, which connect the cores and thus afford the requisite magnetizable quality. The bearings of the armature shaft are preferably in the cast-iron portions. A convenient way to construct the plates is to form a mold of the proper shape and cast the cast-iron portion upon the wrought-iron bars, which are previously laid in position.

In the accompanying drawings, Figure 1 is a transverse section of the frame of the machine, and Fig. 2 a longitudinal section.

Referring to the figures, A' and $A^2$ represent the pole-pieces or polar extensions of the dynamo-electric generator. These extensions are secured upon the cores or magnet-bars $a'$ $a^2$ $a^3$ $a^4$ by bolts B' and $B^2$, which respectively extend from the pole-pieces through the two bars E' $E^2$. These bars are constructed with curved ends which lap over the respective cores $a'$ $a^2$ $a^3$ $a^4$. The nuts $b'$ $b^2$ turn upon the bolts B' $B^2$, and by means of them the pole-pieces are held in position and may be readily adjusted. Usually the pole-pieces are fastened by bolts extending through the cores. This necessitates the cutting away of a large amount of the magnetizable metal, and is therefore objectionable. The construction here presented requires no holes through the cores. The magnet-bars or cores $a'$ $a^2$ $a^3$ $a^4$ are supported by plates, one only of which is shown, at C.

The end plates are for the most part of cast-iron, as it is necessary that the frame should retain sufficient magnetization when the machine is allowed to rest several days to polarize it when it is next operated; but to give greater magnetic efficiency wrought-iron bars D' $D^2$ are inserted in the end plates. These bars connect the respective cores $a'$ $a^2$ $a^3$ $a^4$. These plates, in connection with the cast-iron plates, possess the double advantage of being capable of more powerful magnetization and of retaining their polarization during long periods of disuse.

I claim as my invention—

1. In an electric machine, the combination, with the field-magnet cores, of a cast-iron end plate and wrought-iron plates connecting the cores and in magnetic contact with the end plates, substantially as described.

2. In a dynamo-electric generator, an end plate or frame partly of cast-iron and partly of wrought-iron, substantially as described.

3. In an electric generator, an end plate of cast-iron and wrought-iron bars sunk into the cast-iron and connecting the cores, substantially as described.

In testimony whereof I have hereunto subscribed my name this 23d day of August, A. D. 1886.

JAMES W. EASTON.

Witnesses:
DANL. W. EDGECOMB,
CHARLES A. TERRY.